United States Patent

Lopez-Cacicedo

[11] 3,977,951
[45] Aug. 31, 1976

[54] ELECTROLYTIC CELLS AND PROCESS FOR TREATING DILUTE WASTE SOLUTIONS

[75] Inventor: Carlos Lopez-Cacicedo, Wirral, England

[73] Assignee: The Electricity Council, London, England

[22] Filed: Sept. 20, 1974

[21] Appl. No.: 508,027

[30] Foreign Application Priority Data
Sept. 24, 1973 United Kingdom............... 44650/73

[52] U.S. Cl.............................. 204/149; 204/130; 204/222; 204/263; 204/275
[51] Int. Cl.².................... C02B 1/82; C25D 17/12
[58] Field of Search............. 204/DIG. 10, 263, 275, 204/130, 149, 222

[56] References Cited
UNITED STATES PATENTS

| | | |
|---|---|---|
| 1,051,556 | 1/1913 | Consigliere........................ 204/36 |
| 2,275,194 | 3/1942 | Sizelove............................. 204/284 |
| 3,022,232 | 2/1962 | Bailey et al.......................... 204/36 |
| 3,699,014 | 10/1972 | Eisner............................... 204/35 R |
| 3,753,889 | 8/1973 | Eisner................................ 204/198 |
| 3,764,497 | 10/1973 | Tarjanyi et al..................... 204/149 |

FOREIGN PATENTS OR APPLICATIONS 1,500,269  9/1967  France......................... 204/DIG. 10

Primary Examiner—R. L. Andrews
Attorney, Agent, or Firm—Beveridge, DeGrandi, Kline & Lunsford

[57] ABSTRACT

An electrolytic cell, particularly for use with very dilute solutions, has an apertured or rough surfaced electrode and a fluidised bed of non-conducting particles adjacent said surface, the particles being of such size that they pass through the apertures or enter between the peaks or protrusions of the roughened surface.

19 Claims, 7 Drawing Figures

ELECTROLYTIC CELLS AND PROCESS FOR TREATING DILUTE WASTE SOLUTIONS

BACKGROUND OF THE INVENTION

1. Field of the Invention

This invention relates to electrolytic cells having plane (flat or curved) electrodes in a liquid electrolyte and to the electro-chemical treatment of waste effluents or other solutions using such electrolytic cells.

2. Prior Art

In electrolytic cells using liquid electrolytes, the maximum current density is usually limited by the ionic depletion of the electrolyte immediately adjacent the surface of the electrode on which material is deposited. This problem arises very particularly with cells for electro-chemical reactions involving very dilute or low concentration electrolytes, such as are used for example in the recovery of metals and in the electrochemical treatment of dilute toxic solutions. In the layer of electrolyte immediately adjacent the cathode surface of a cell in which a metal is being deposited on the cathode, the limit to the current density arises because the rate of deposition of metal cannot be greater than the rate of diffusion of the metal ions into the layer of solution adjacent the electrode. If any attempt is made to pass a greater current through the cell, this will result in the evolution of hydrogen (assuming the electrolyte is an aqueous solution).

In attempts to overcome this problem, it has been proposed to use a fast flow of electrolyte through the cell to break up the boundary layer. Another way proposed is the use of rotating electrodes. Also it has been proposed to form an electrode, usually the cathode, as a fluidised bed of conducting material.

It is an object of the present invention to provide means for increasing the limiting current density in a cell having stationary electrodes.

SUMMARY OF THE INVENTION

According to the present invention in an electrolytic cell having a flat or curved rigid plane electrode in a liquid electrolyte, the electrode is formed of apertured material or material having surface irregularities and there is provided a fluidised bed of non-conducting particles adjacent the surface of the electrode.

The use of a fluidised bed of glass particles adjacent an electrode is, in itself, known; see for example "Applications of Fluidized Beds in Electrochemistry" by P. Le Goff et al., Industrial and Engineering Chemistry, Vol. 61 No. 10, October 1969, pages 8 to 17. This prior art is not concerned with dilute solutions or the problems arising therewith. In the present invention, the fluidised bed is used adjacent an apertured electrode or an electrode having surface irregularities so that the particles pass through the apertures or enter between the surface irregularities so as to break up the boundary layer and so improve the efficiency of the cell, very particularly with dilute solutions, as described later.

In a simple cell without any separator or separators between the electrodes, the fluidised bed may be provided in the region between the two electrodes. If the cell has a separator dividing the electrolyte into anolyte and catholyte regions, the fluidised bed may be provided in the anolyte or catholyte compartments or both according to whether the main or desired reaction is anodic or cathodic. Normally it will be necessary to have it only in the catholyte region since the limiting current in most cells is determined by ionic depletion of the electrolyte layer adjacent the cathode surface. These particles may be of any suitable material which is electrically non-conducting and which is inert with respect to the materials present in the cell. Typically plastics materials or glass may be employed. The particles conveniently are small beads; their shape is immaterial but for a typical cell, spheroidal particles having dimensions of 0.5 to 2 mm may be employed. Sand is another material which may be used. The particles may be fluidised by flow of the electrolyte. The effect of this fluidised bed in conjunction with the particular form of electrode is to break up the surface layer of electrolyte adjacent the electrode and to cause mixing of the electrolyte. The shaping of the electrode allows the fluidised particles to approach the surface of the electrode from many possible directions. With an apertured or mesh electrode, movement of the electrolyte to the region adjacent the electrode surface is facilitated by the apertures. These apertures and the particle size are preferably such that the particles can pass through the apertures in the electrode. If the electrode has a rough surface, the roughness is preferably such that a particle can have access to the part of the electrode between any peaks or protrusions. Considered in another way, the peaks or protrusions and the valleys or recesses between them preferably have dimensions larger than the particle size. The roughness may be random or it may be in any regular pattern. Protrusions for example might be of sinusoidal shape in section or might be of pyramid of truncated pyramid form.

With electrodes of this form, the movement of the liquid in the boundary layer occurs in many possible directions and mixing of the electrolyte is improved. The mechanical mixing of the electrolyte in this way prevents the formation of a surface layer depleted of ions until a much higher current density is reached compared with what occurs in a cell without any such mechanical mixing. It is found that the fluidised bed of non-conducting particles in combination with the above-described form of electrode also promotes the formation of smooth metal deposits on the cathode.

By choice of the specific gravity of the particles, the size of the particles and the expansion of the fluidised bed it is possible to provide a wide range of mixing conditions and appropriate conditions for the particular cell may readily be found empirically.

The fluidising is conveniently effected by pumping the electrolyte into the cell at the bottom thereof or, if separate catholyte or anolyte chambers are employed, into the appropriate chamber or chambers, the electrolyte overflowing at the top and being recirculated. A flow distributor such as a porous plate may be employed in the bottom of the cell.

The above-described cell finds particular application in the treatment of dilute solutions, for example in the recovery of metal from waste effluents such as rinse waters from rinse baths used after electro-plating or pickling.

The invention thus further includes within its scope a method of electro-chemical treatment of waste effluents or other solutions comprising the steps of passing the solution through a cell containing electrodes and a fluidised bed of non-conducting particles adjacent at least one electrode formed of apertured material or material having surface irregularities and passing a current between the electrodes. The bed may be fluidised by passage of the solution to be treated or a part thereof or by recirculation of solution being treated.

DESCRIPTION OF PREFERRED EMBODIMENTS

Figure 1:
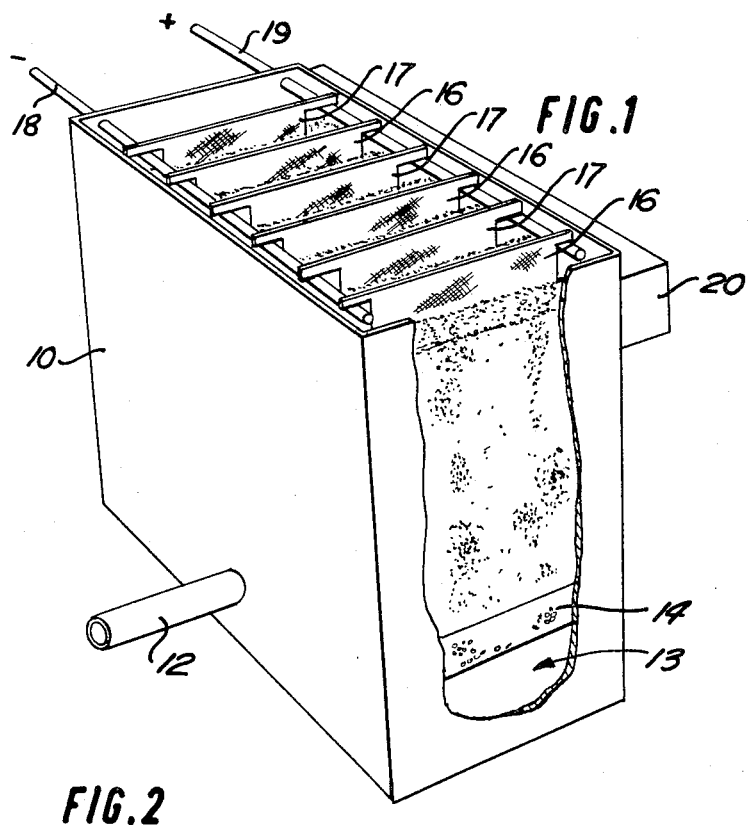
FIG. 1 is an isometric view of one construction of cell according to the invention.
Figure 2:
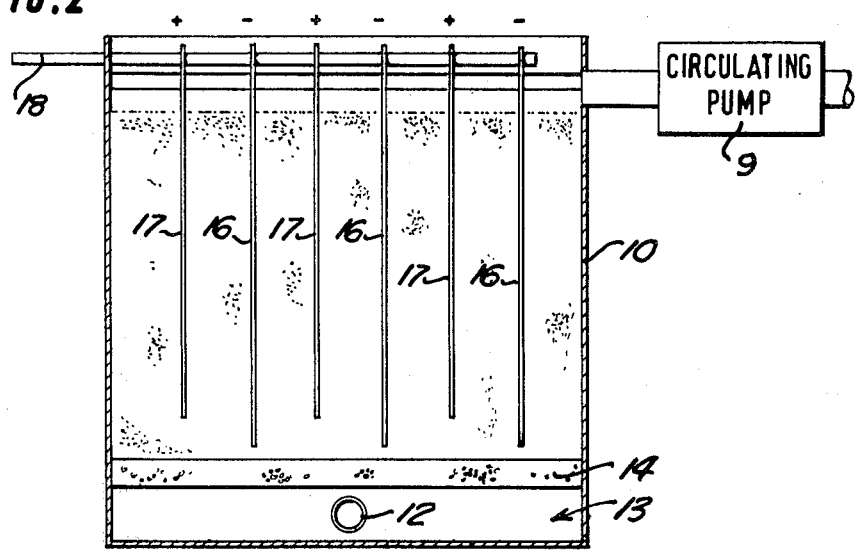
FIG. 2 is a diagrammatic section through the cell of FIG. 1.

FIGS. 1 and 2 illustrate a cell having electrodes immersed in a liquid electrolyte without any separator between the electrodes. The cell consists essentially of a rectangular box 10 having, near the bottom of one side face, an inlet 12 for the electrolyte, this inlet 12 leading to a shallow bottom chamber 13 beneath a ceramic distributor 14. This distributor 14 may be formed with apertures or slots but preferably is a porous plate with pore sizes between 100 and 300 μm. Within the outer casing 10 above the flow distributor 14 are a series of electrodes comprising cathodes 16 of wire mesh or apertured plates arranged alternately with anodes 17. The cathodes are connected in parallel to a busbar 18 and the anodes to a busbar 19. These two busbars 18, 19 are used to support the electrodes 16, 17, the cathodes 16 being electrically isolated from the anode busbar 19 by means of insulating material (not shown) and the anodes 17 are separated from the cathode busbar 18 by means of insulating material (not shown).

The cathodes are slightly wider and longer than the anodes so that deposition of metal at the edges is not enhanced. This avoids short-circuiting and promotes a more uniform growth of metal over the whole cathode.

The cell above the flow distributor 14 is filled with spherical particles of about 0.5 to 2 mm diameters formed of glass or plastics material or other materials which is inert with respect to the electrolyte and electrode material. The apertures in the electrodes are larger than the particle size so that electrolyte and particles can flow through such apertures. The electrolyte is pumped in through the aforementioned inlet 12 and passes upwardly through the distributor 14 to cause these particles to form a fluidised bed. At the top of the cell, the electrolyte overflows into a collecting trough 20 (FIG. 2) for recirculation back to the pump 9. The fluidised bed fills the spaces between the electrodes up to a level just below the collecting trough. As previously described, this fluidised bed causes mixing of the electrolyte material in the region immediately adjacent to the electrode surfaces and, in particular, immediately adjacent the cathode surfaces so thereby reducing the ionic depletion of this region despite the deposition of material from the electrolyte onto the cathode. In particular the apertures through the electrodes permit of electrolyte passing through the electrodes as a particle moves adjacent an aperture so thereby assisting movement of the electrolyte in the region immediately adjacent to the surface of the electrode.

Figure 3:
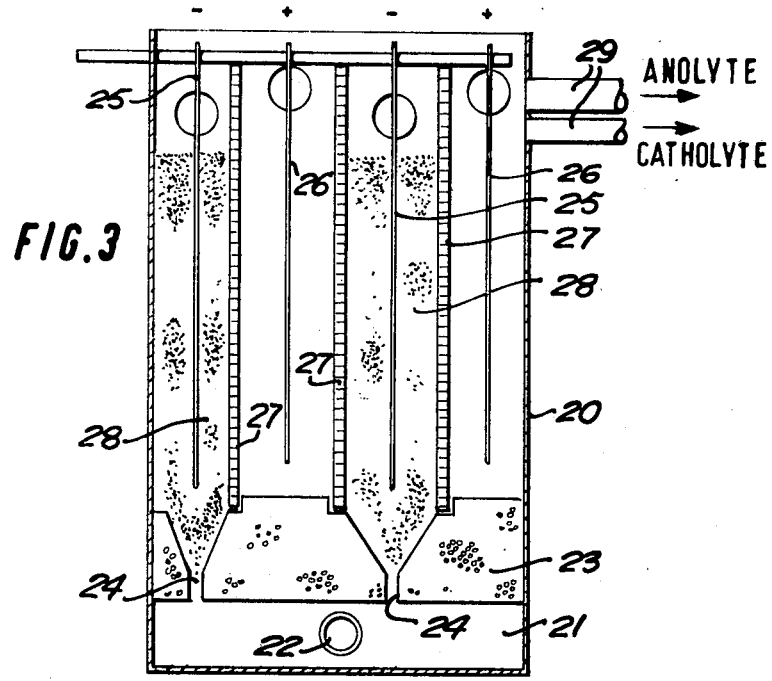
FIG. 3 is a diagrammatic section through another construction of cell.
Figure 4:
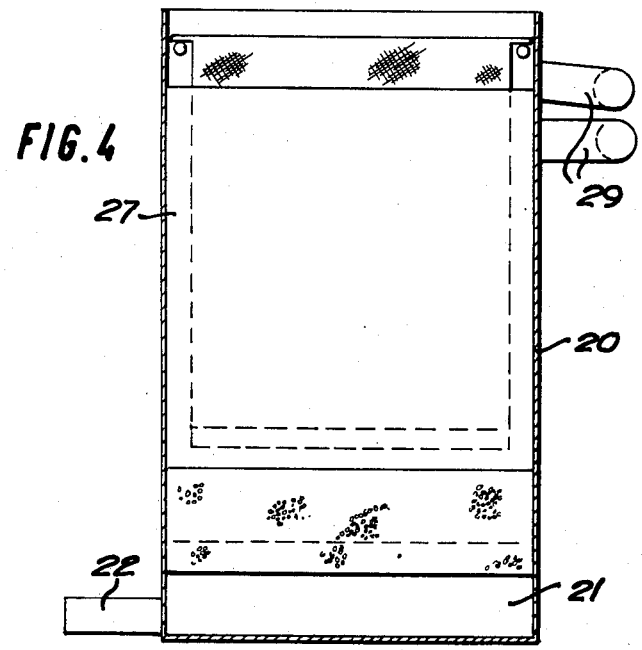
FIG. 4 is an end view of the cell of FIG. 3.

FIGS. 3 and 4 illustrate a cell in which separating membranes are provided between the electrodes to form anolyte and catholyte compartments. The cell comprises an outer casing 20 having a bottom chamber 21 into which electrolyte is fed through an inlet 22. Above the bottom chamber is a distributor 23 which, in this particular example, has slots 24 parallel to the electrode surfaces, one slot being disposed beneath each cathode. In the cell illustrated, there are two cathodes 25 and two anodes 26, each electrode being flat, the anodes and cathodes being disposed alternately parallel to one another. The cathodes, as before, are formed of mesh or apertured plates. The anodes may be mesh or may be plates with or without apertures. The separators are in the form of a porous diaphragm 27 which extend down from the top of the cell to the distributor. These separators may be, for example, ion exchange membranes or tightly woven artificial fibre cloths. In the construction shown in FIG. 3, a rigid porous diaphragm is employed. Particles of inert material, for example glass or a plastics material, form a fluidised bed 28 in the cathode chambers only in the construction shown in FIGS. 3 and 4, the material being fluidised by the electrolyte flowing in through the distributor 23 up to collecting manifold outlets 29. It will be appreciated however that it is also possible to have fluidised beds in the anode chambers if required, in which case electrolyte distributors will be provided for the anolyte chambers. Separate collecting manifolds 29 are provided for collecting the anolyte and catholyte respectively. In the particular construction shown, only one inlet 22 is provided for the electrolyte, this electrolyte fluidising the particles in the cathode chamber. There will be a small flow through the porous membrane 27 from the catholyte to the anolyte chamber due to the higher pressure drop in the cathode fluidised bed and hence the two collecting manifolds are required.

Figure 5:
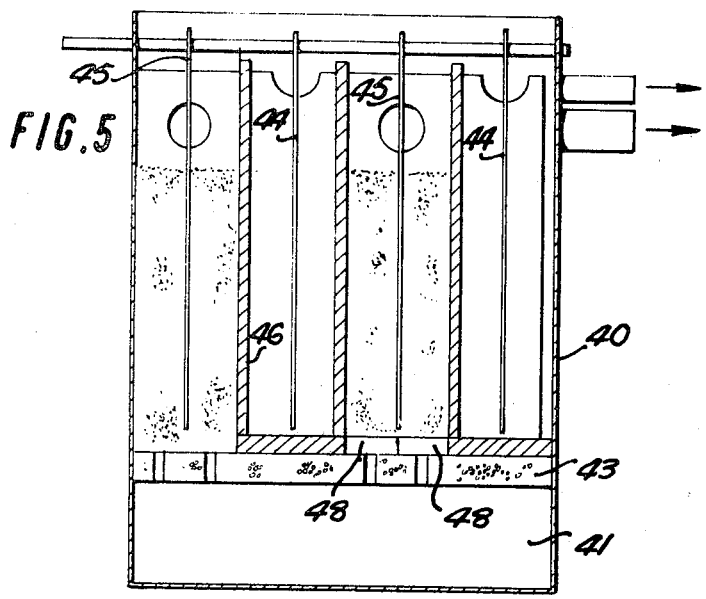
FIG. 5 is a diagrammatic section through yet another construction of cell.
Figure 6:
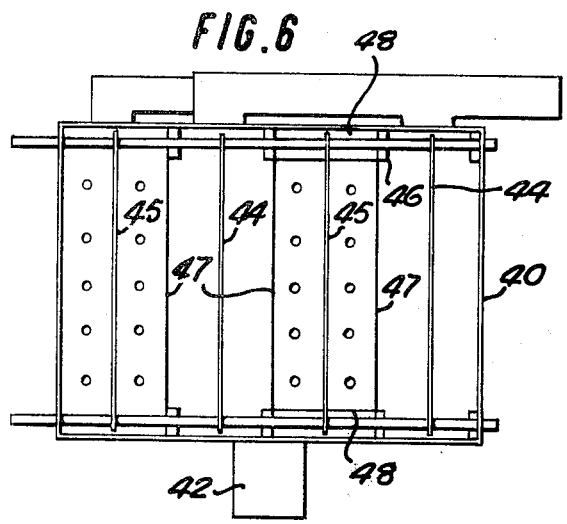
FIG. 6 is a plan view of the cell of FIG. 5.
Figure 7:
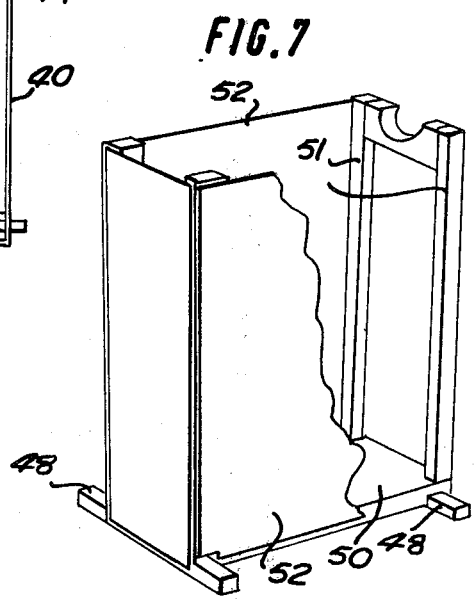
FIG. 7 is an isometric view partly cut away of a membrane assembly forming a diaphragm such as might be used in the cell of FIGS. 5 and 6.

FIGS. 5 and 6 show a cell with parallel plate electrodes in a liquid electrolyte and having separators between the electrodes in which each separator comprises a non-rigid diaphragm for example a cloth or ion exchange membrane. In FIGS. 5 and 6, the cell comprises a container 40 having bottom space 41 into which the electrolyte is pumped via an inlet 42 and has distributor 43 above which are the cell chambers containing anodes 44 and cathodes 45 with separators formed by frames 46 of non-conducting material supporting a membrane or cloth 47. The cathodes are formed of wire mesh, expanded mesh or apertured plates. As will be described with reference to FIG. 7, this membrane or cloth is sealed to the frame to avoid any open passage for the catholyte to pass to the anode chamber or vice versa. If a cloth is used there will be a small flow from the catholyte chamber which contains the fluidised bed to the anode chamber through the cloth due to the higher pressure drop in the fluidised bed. The frames 46 are arranged inside the cell and are spaced from one another by spacers 48. As in the arrangement previously described, the fluidised bed ensures mixing of the electrolyte material in the region immediately adjacent to the cathode surface thereby reducing the ionic depletion in this region. FIG. 7 shows in further detail the construction of a single membrane bag formed of a solid base 50 with upright frame members 51, four membranes 47 being attached to the frame members so that the unit forms an open top enclosure for a cathode electrode. Extending outwardly from the base are the aforementioned spacers 48 for spacing the membranes one from another.

Although rectangular cells have been more particularly described and illustrated, the invention is equally applicable to cylindrical cells.

The type of cell described above finds particular application in the electro-chemical treatment of dilute solutions, such as for example, washings from plating shops and other industrial effluents. For example, in electroplating or pickling operations, the plating or pickling stages are often followed by rinsing, in rinse baths, to remove, from the articles being treated, the remnants of the pickling or plating solutions. The rinse bath, after each washing, will be enriched in metal ions until it no longer satisfactorily performs its washing function. To control the metal ion concentration, portions of the rinse water may be withdrawn from the rinse bath and replaced by clean water and the withdrawn water may be treated in a cell as described above for recovery of the metal. The electrolytic cell and rinse bath can be arranged so that the rinse waters from the bath are continuously recirculated through the cell and back to the rinse bath, thus maintaining the concentration of the rinse waters at a low level.

As an example of the application of the present invention, it may be used for recovering copper from dilute solution of copper salts.

It has been found that deposition of copper from dilute solutions (around 0.2 gram per liter) occurs in cells of the type described above with mesh electrodes at current efficiencies of 90% or more down to concentrations of 0.1 grams per liter, producing actual copper plate and not powder. The current densities were of the order of 5mA cm$^{-2}$. This efficiency is far greater than has been obtained at similar concentrations using cells with fast flowing electrolyte or with a fluidised bed electrode. It is found that it is not generally necessary to have any separating membrane as described with reference to FIGS. 3 to 7 when depositing copper from copper sulphate.

In recovering copper, copper mesh cathode electrodes may be employed if a homogeneous material is required. However, titanium mesh electrodes can be re-used; the titanium mesh is employed in a cell as described above to recover copper (99.9+) from the rinse water and is subsequently used as an anode in a plating cell. In the plating cell, once the copper has dissolved, the titanium mesh will passivate. It can then be re-used in the recovery cell as described above.

In a copper recovery cell, a lead anode may be employed. Mesh anodes, both of antimonial lead and silver lead, have been found to have a longer life than plate anodes.

Compared with fluidised bed electrodes of the kind using conductive particles, the cell of the present invention has several advantages. The handling of the electrodes is simpler. Separating membranes may not be required. Agglomeration of particles, such as occurs with fluidised bed electrodes, is avoided. A definite electrode potential is achieved as distinct from the range of potentials present with fluidised bed electrodes. This last point is of significance when several reactions may take place. It is also easier, and takes less power, to fluidise glass beads than metal beads.

Although mesh or apertured electrodes are preferred the use of electrodes with a rough or irregular surface in conjunction with the fluidised bed of non-conducting particles, does give an improved cell efficiency at low concentrations compared with prior types of cell.

I claim:

1. In an electrolytic cell having rigid plane electrodes in a liquid electrolyte; the improvement comprising at least one electrode having a plurality of apertures extending therethrough and wherein there are provided a bed of non-conducting particles in the electrolyte between the electrodes adjacent the surface of said at least one electrode, the particles being smaller than said aperatures, and means for circulating the electrolyte upwardly through said bed to thereby fluidize the bed.

2. A cell as claimed in claim 1 and wherein said means for circulating the electrolyte comprises a pump for pumping the electrolyte into the cell or a compartment of the cell at the bottom thereof for fluidising the particles.

3. A cell as claimed in claim 2 wherein a flow distributor is provided in the bottom of the cell.

4. A cell as claimed in claim 3 wherein the flow distributor comprises a porous plate.

5. A cell as claimed in claim 2 and having an overflow outlet for the electrolyte at the top of the cell.

6. A cell as claimed in claim 1 and without any separator between the electrodes wherein the fluidised bed substantially fills the region between a cathode and an anode electrode.

7. A cell as claimed in claim 1 and having a separator dividing the electrolyte into anolyte and catholyte regions wherein the fluidised bed is provided in the anolyte region only.

8. A cell as claimed in claim 1 and having a separator dividing the electrolyte into anolyte and catholyte regions and wherein the fluidised bed is provided in the catholyte region only.

9. A cell as claimed in claim 1 and having a separator dividing the electrolyte into anolyte and catholyte regions and wherein the fluidised bed is provided in both these regions.

10. A cell as claimed in claim 1 wherein said particles are spheroidal particles of plastics material.

11. A cell as claimed in claim 1 wherein said particles are spheroidal particles of glass.

12. A cell as claimed in claim 1 wherein said particles are sand particles.

13. A cell as claimed in claim 1 wherein the cathode is formed of apertured material 14. A cell as claimed in claim 1 wherein said one electrode is formed of metal mesh material.

15. In an electrolytic cell having rigid plane electrodes in a liquid electrolyte; the improvement comprising at least one electrode of material with surface irregularities, a bed of nonconducting particles in the electrolyte between the electrodes adjacent the surface of said at least one electrode, and means for circulating the electrolyte upwardly through said particles to fluidise said bed, said particles being spheroidal particles having dimensions of 0.5 to 2 mm and said surface irregularities comprising peaks or protrusions with valleys or depressions between them, the dimensions of said peaks or protrusions and of said valleys or depressions being larger than the particle size.

16. A method of electro-chemical treatment of dilute waste effluents or other solutions comprising the steps of passing the solution between anode and cathode electrodes in a cell, at least one of said electrodes being apertured, fluidising a bed of non-conducting particles adjacent said at least one electrode, the particles being smaller than the apertures in said one electrode, and passing an electric current between the electrodes.

17. A method as claimed in claim 16 wherein the bed is fluidised by passage of the solution to be treated.

18. A method as claimed in claim 16 wherein the bed is fluidised by recirculation of solution being treated.

19. In a method of removing metal from a dilute solution of a metal salt by electrolysis of the solution in a cell having a cathode and an anode between which an electric current is passed, the improvement comprising the steps of using, as the cathode, an apertured metal structure and fluidising, by flow of said solution, non-conductive particles, of a size smaller than the apertures in the cathode, in the region adjacent the surface of the cathode facing the anode.

* * * * *